United States Patent [19]

Daghe et al.

[11] Patent Number: 4,554,944
[45] Date of Patent: Nov. 26, 1985

[54] OPERATING WRENCH FOR TAMPERPROOF HYDRANTS

[75] Inventors: Joseph L. Daghe; Dennis W. Humes, both of Decatur; Mervin D. Stanley, Stonington, all of Ill.

[73] Assignee: Mueller Co., Decatur, Ill.

[21] Appl. No.: 736,831

[22] Filed: May 22, 1985

[51] Int. Cl.⁴ ............................ F16K 35/06; F03B 9/06
[52] U.S. Cl. ................................ 137/296; 137/382.5; 137/800; 81/176; 220/85 P; 220/284; 251/291
[58] Field of Search ................. 81/77, 158, 162, 174, 81/176, 125.1; 137/296, 382, 382.5, 371, 377, 381, 800; 215/213, 215; 220/284, 285, 286, 253; 251/291

[56] References Cited

U.S. PATENT DOCUMENTS

| Re. 27,616 | 4/1973 | Diaz | 137/382.5 |
|---|---|---|---|
| 572,035 | 11/1896 | Stokes | 81/176 |
| 581,823 | 5/1897 | Harrison | 81/176 |
| 1,123,462 | 1/1915 | Anderson | 81/176 |
| 1,465,009 | 8/1923 | Wasseth | 81/125.1 |
| 3,070,115 | 12/1962 | Jester | 137/296 |
| 3,453,655 | 7/1969 | Quinones et al. | 137/296 |
| 3,492,841 | 2/1970 | Ipri | 70/231 |
| 3,532,108 | 10/1970 | Sullivan | 137/296 |
| 3,532,109 | 10/1970 | Smith | 137/296 |
| 3,709,249 | 1/1973 | Diaz | 137/296 |
| 3,840,041 | 10/1974 | McMurray | 137/296 |
| 3,935,877 | 2/1976 | Franceschi | 137/296 |
| 4,083,377 | 4/1978 | Luckenbill | 137/296 |
| 4,182,361 | 1/1980 | Oakey | 137/296 |
| 4,398,556 | 8/1983 | Pereira et al. | 137/296 |

Primary Examiner—George L. Walton
Attorney, Agent, or Firm—Cushman, Darby & Cushman

[57] ABSTRACT

A tamperproof fire hydrant which can only be operated with use of a special operating means or tool thus preventing the opening of the hydrant by unauthorized persons for unauthorized use. The hydrant is provided with the usual polygonal end portion of the rotatable operating nut extending out of the top closure member. A dome shaped cap is mounted on the polygonal end portion of the operating nut for free rotation relative thereto, the dome shaped cap having a skirt with the lower edge thereof spaced from the tubular hold down nut or top closure member of the fire hydrant to provide a limited access space to the polygonal end portion for reception of the special operating means. The special operating means is also capable of being used as a tool to remove the nozzle cap off of the usual nozzle and to install the hose coupling on the nozzle.

9 Claims, 9 Drawing Figures

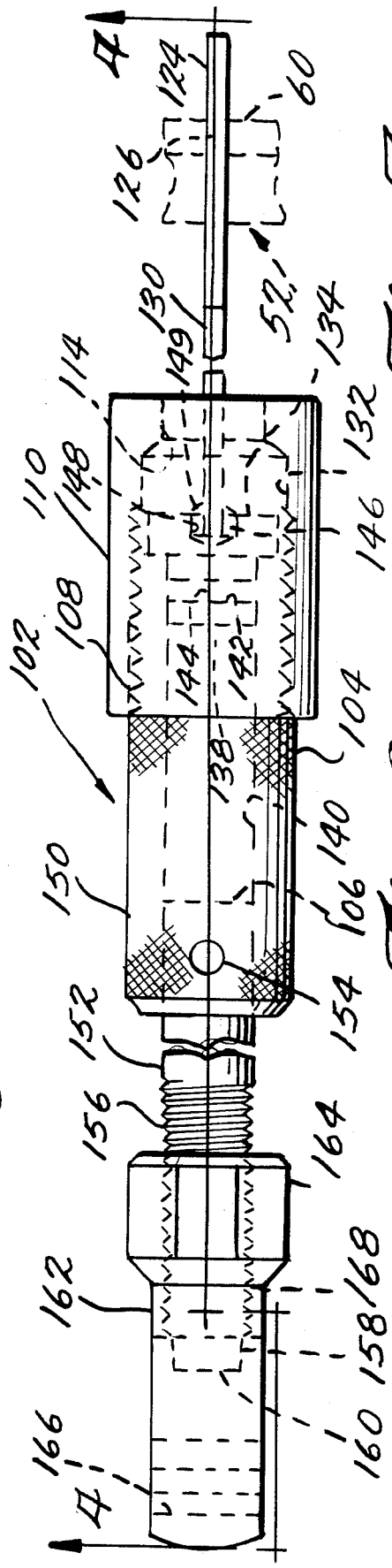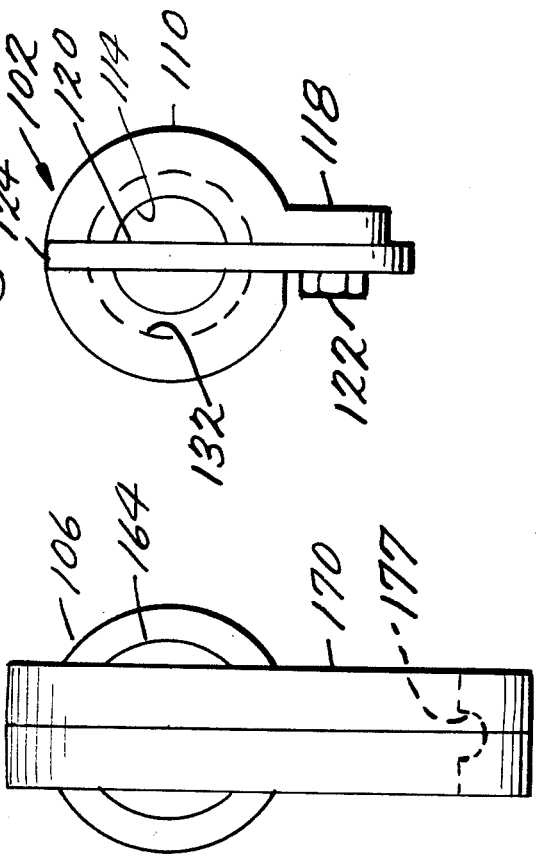

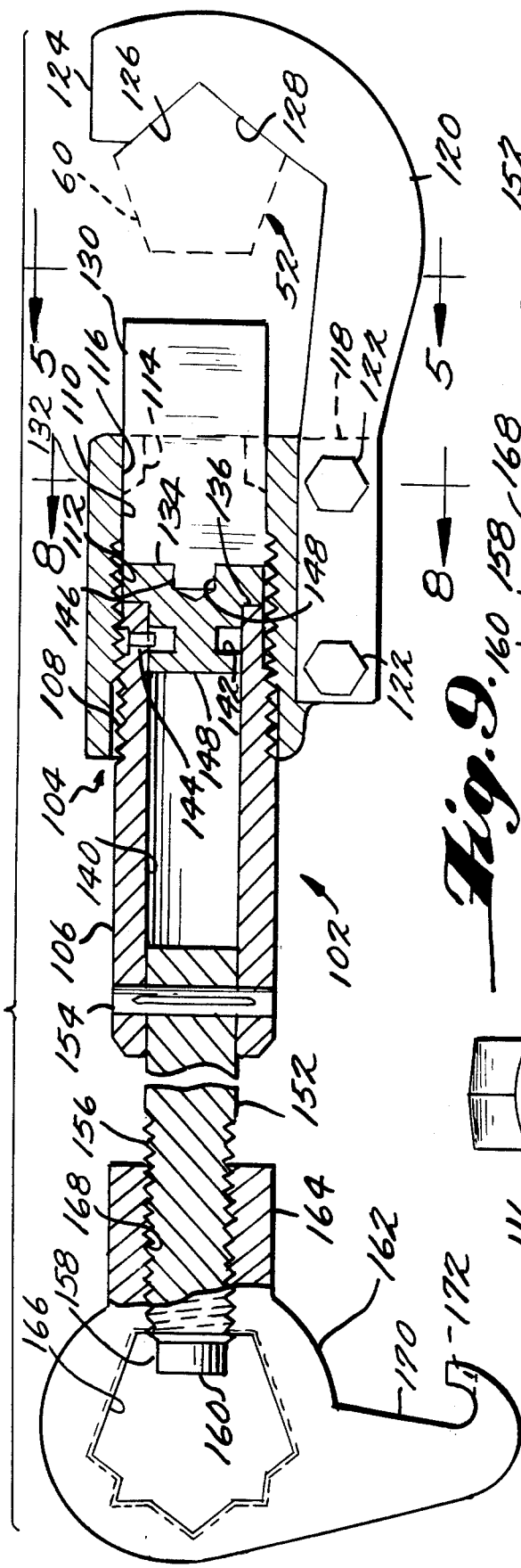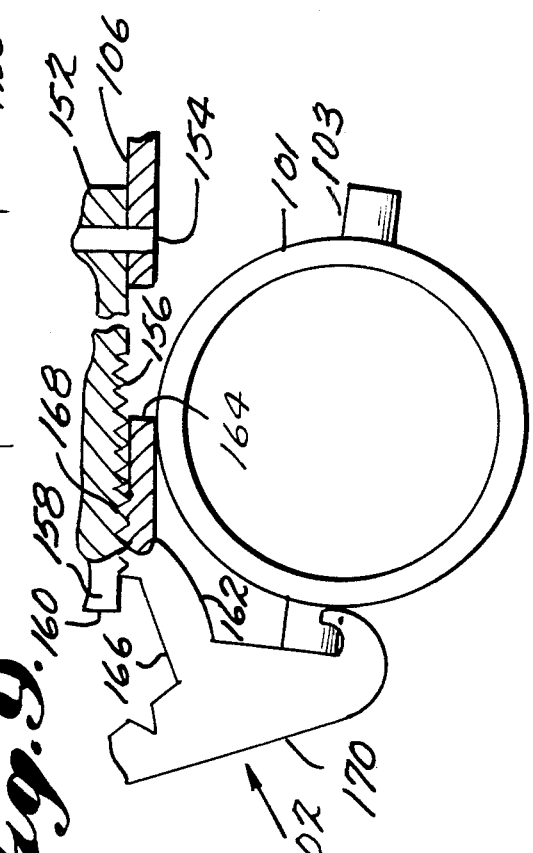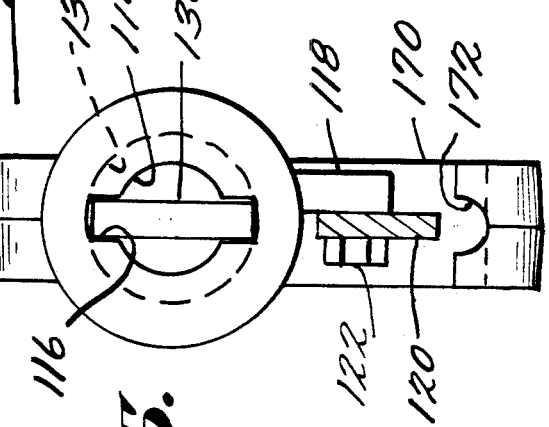

OPERATING WRENCH FOR TAMPERPROOF HYDRANTS

FIELD OF THE INVENTION

The present invention relates to improvements in a tamperproof fire hydrant to prevent unauthorized use of the hydrant. More specifically, the present invention relates to a tamperproof hydrant provided with a dome shaped cap covering the polygonal end portion of the operating nut, the dome shaped cap being freely rotatable relative to the polygonal end portion. The dome shaped cap provides only limited access space to the polygonal end portion of the operating nut by a special operating means or device which is also capable of use to remove the hydrant nozzle caps off of the usual hydrant nozzles as well as for applying a hose coupling to the usual nozzle.

BACKGROUND OF THE INVENTION

In recent years municipalities have found an increasing use of fire hydrants by unauthorized persons during hot weather, civil disturbances and the like. The unauthorized use causes considerable waste of water which is both costly and dangerous, especially when it taxes reservoirs and there may be a fire and the use of other fire hydrants are handicapped as the water pressure therein may be reduced.

Heretofore, efforts have been made to design tamperproof fire hydrants which required specially designed and manufactured fire hydrants, such hydrants requiring the utilization of special tools attached to operate the hydrants by depressing the valve stems vertically against water pressure to open hydrants. Additional structures have required special operating devices as the operating nut had a peculiarly shaped head. These types of tamperproof hydrants were costly to manufacture and required municipalities to spend a great deal of money replacing existing hydrants.

A second type of tamperproof hydrant utilizing a dome shaped cap to conceal the conventional polygonal end portion of the operating nut and leaving only limited access thereto was designed and required extensive modification of the fire hydrants at the site of use. While this type of tamperproof hydrant left only a limited access space to get at the polygonal end portion, the means for rotatably retaining the dome shaped cap operatively on the polygonal end portion of the operating nut included a modification with a number of parts including rigidly fixing a cylindrical member to the polygonal end portion by bolts. This arrangement was costly and if any of the bolts subsequently backed out of the cylindrical part, they would engage the flange of the dome shaped cap or the retaining ring preventing the cap from being freely rotatable.

An improved type of tamperproof hydrant utilizing a dome shaped cap freely rotatable on the polygonal end portion of the operating nut to provide a limited access space is disclosed in the copending U.S. application Ser. No. 736,830, filed concurrently herewith on May 22, 1985 by Wilbur R. Leopold, Jr. and Dennis Humes and entitled TAMPERPROOF FIRE HYDRANTS. This application has a common assignee, Mueller Co. of Decatur, Ill. and the subject matter of the same is incorporated by reference herein.

PRIOR ART

The following prior art patents generally relate to tamperproof hydrants requiring special operating means or tools:

| Number    | Name           | Issue Date     |
|-----------|----------------|----------------|
| 3,070,115 | Jester         | Dec. 25, 1962  |
| 3,453,655 | Quinones et al | Jul. 1, 1969   |
| 3,492,841 | Ipri           | Feb. 3, 1970   |
| 3,532,108 | Sullivan       | Oct. 6, 1970   |
| 3,532,109 | Smith          | Oct. 6, 1970   |
| 3,709,249 | Diaz           | Jan. 9, 1973   |
| Re. 27,616| Diaz           | Apr. 17, 1973  |
| 3,840,041 | McMurray       | Oct. 8, 1974   |
| 3,935,877 | Franceschi     | Feb. 3, 1976   |
| 4,182,361 | Oakey          | Jan. 8, 1980   |
| 4,398,556 | Pereira et al  | Aug. 16, 1983  |

U.S. Pat. No. Re. 27,616 discloses a protective device for fire hydrants which allows limited access of the polygonal end of the operating nut. To operate the hydrant of U.S. Pat. No. Re. 27,616 a flat wrench of the pliers type having recesses in the jaws thereof for engaging the polygonal end portion of the operating was used. However, such a wrench could not be used to remove the nozzle cap for the usual nozzle of the hydrant barrel as the thinnest of the wrench was such it could not stand the treatment encountered or provide the necessary mechanical advantage or leverage. It has been found in practice, the nozzle caps are quite rigidly held onto the nozzle due to corrosion and require considerable force, including the jumping on the ends of the tools by the firemen or the striking of the ends of the tools with a hammer to provide the necessary leverage.

U.S. Pat. No. 3,709,249 discloses a tamperproof fire hydrant similar to the U.S. Pat. No. Re. 27,616 with the exception that a cylindrical part having a chordal face is rigidly secured to the polygonal end portion, the chordal face being exposed in the limited access space for reception of a wrench having a chordal face engaging the surface for mating with the chordal face of the cylindrical collar.

U.S. Pat. No. 3,532,108 and 3,532,109 disclose similar arrangements of tamperproof hydrants requiring a special tool attached to the hydrant for moving the valve stem vertically downwardly against water pressure.

U.S. Pat. No. 3,935,877 discloses a modification of a conventional hydrant having a cap housing with an exposed surface having major faces and minor faces so arranged as to require a complimentary tool clamped onto the same for operating the hydrant. The cap housing is rigidly retained on the polygonal portion of the operating nut or stem.

The remaining patents listed above are of general interest in that they show various tamperproof hydrant arrangements for operating the same.

BRIEF SUMMARY OF THE INVENTION

The present invention relates to a tamperproof hydrant including barrel means having the usual hydrant nozzles with hydrant nozzle caps thereon. The barrel means has an open end portion and valve means are positioned in the lower portion thereof with valve stem means extending upwardly from the valve means. A top closure member is secured to the open upper end of the barrel means, the top closure member being provided with an aperture therethrough. A rotatable operating nut is operatively connected to the valve stem for reciprocating the same. A polygonal end portion of the operating nut projects out of the aperture of the top closure member. A tubular hold down nut positions the operating nut against axial movement but permits rotary movement. A dome shaped cap covers the polygonal end portion of the operating nut, the dome shaped cap having a lower edge spaced from the upper end of the hold down nut to provide limited access space to the polygonal end portion of the operating nut. The dome shaped cap can rotate freely relative to the operating nut. Operating means are provided for fitting into the limited access space between the dome shaped cap and the hold down nut, the operating means being adjustable for the size of the polygonal end portion of the operating nut. The operating means is adjustable since the polygonal end portions of the operating nuts manufactured by different companies may be of different sizes and of a different number of sides.

The operating means further includes a rigid handle assembly which carries at its opposite end a box wrench head member having a polygonal aperture therethrough, the box wrench head member having means for adjusting the size of the polygonal aperture to accommodate different size nuts of the hydrant nozzle caps. By providing a rigid handle assembly, the operating means can withstand the heavy forces necessary to remove the nozzle cap.

Additionally, the head portion carries a hook shaped spanner arm extending therefrom which may engage the pins on a hose coupling when the hose coupling is threaded onto or removed from the hydrant nozzle. The ruggedness of the handle assembly again permits the operating means to apply the necessary force to the hose coupling.

BRIEF DESCRIPTION OF THE DRAWINGS

FIG. 3 is a top plan view illustrating the operating means for the present invention;

FIG. 4 is a side sectional view partly in elevation of the operating means taken substantially on the line 4—4 of FIG. 3;

FIG. 5 is a sectional view looking from the right to the left of FIG. 4 and taken substantially on the line 5—5 of FIG. 4;

FIG. 6 is an end elevation view looking from the left of FIG. 4 toward the right;

FIG. 7 is an end elevation view looking from the right of FIG. 4 toward the left;

FIG. 8 is a sectional view taken substantially on the line 8—8 of FIG. 4; and

FIG. 9 is a fragmentary side elevation view illustrating the application of the operating means to pins of a typical hose coupling.

DETAILED DESCRIPTION OF THE INVENTION

Figure 1:
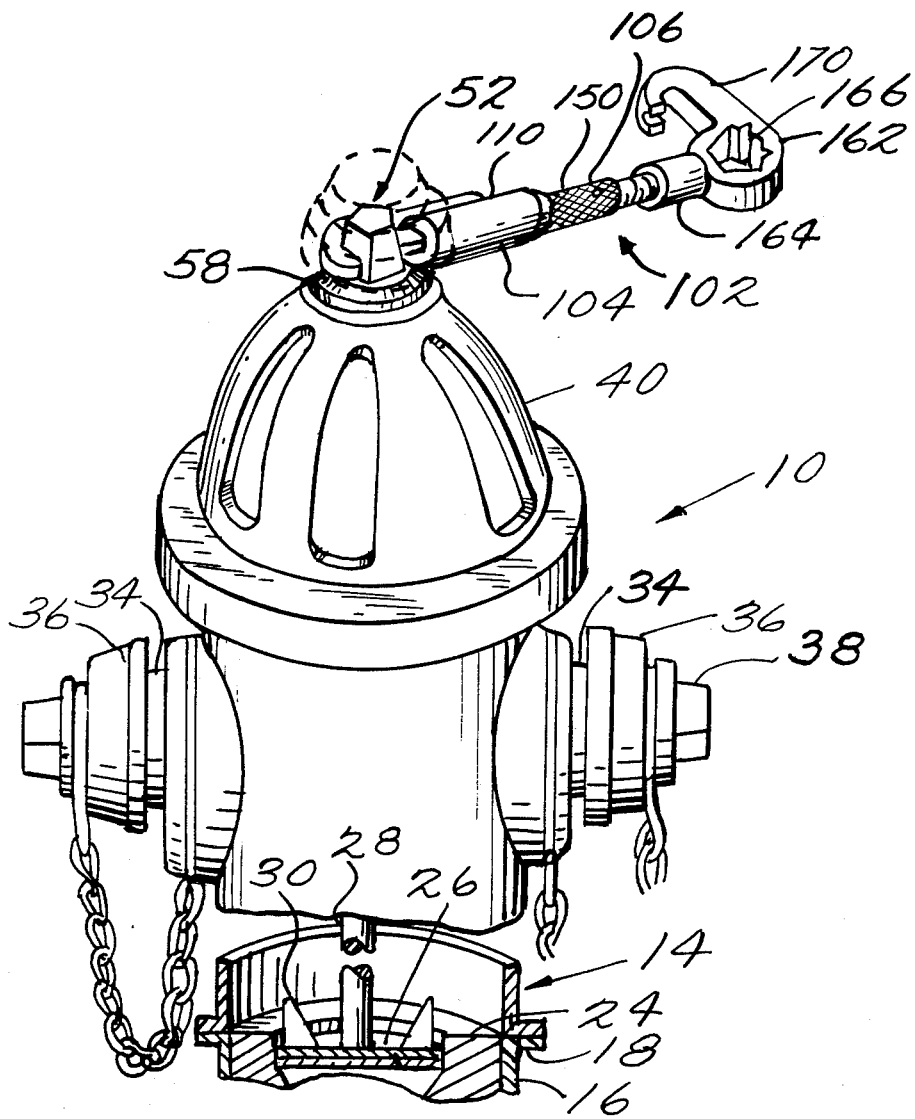
FIG. 1 is a fragmentary perspective view of a tamperproof hydrant of the present invention, the view being partly broken away to illustrate the valve means in the lower portion of the hydrant barrel and the operating means applied to the polygonal end portion in the limited access space.
Figure 2:
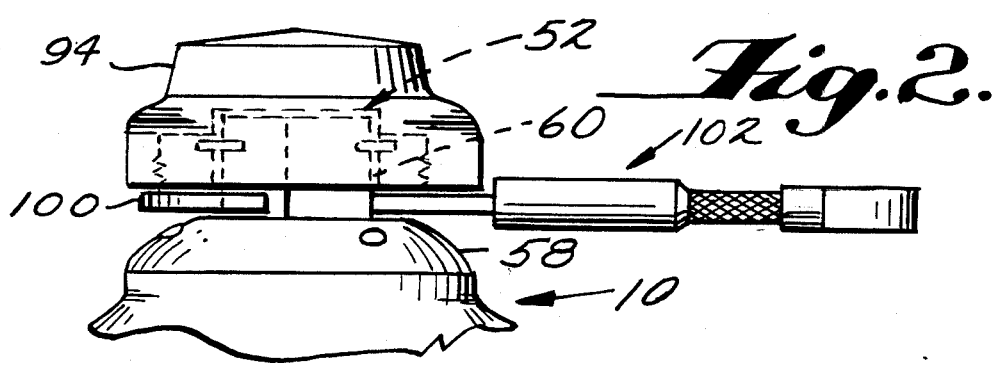
FIG. 2 is an enlarged fragmentary side elevation view of the top portion of the hydrant illustrating the tamperproof arrangement for the hydrant of the present invention and further illustrating the operating means applied to the polygonal end portion operating nut in the limited space between the dome shaped cap and the tubular hold down nut.

Referring now to the drawings wherein like characters or reference numerals represent like or similar parts, the tamperproof hydrant and the operating means of the present invention is illustrated in FIGS. 1 and 2 and is identified generally by the numeral 10. The hydrant 10 is adapted to be attached to a water main (not shown) and includes hydrant barrel means 14 comprising a shoe 16 having an upwardly open mouth surrounded by a peripheral flange 18. The hydrant barrel means may comprise one or more sections with the lowermost section being bolted to the flange 18 of the shoe 16. A main hydrant brass valve seat ring 24 cooperates with a reciprocating main valve element 26. The valve element 26 is provided with an upwardly extending valve stem means 28 and with upwardly extending rib elements 30 which cooperate with longitudinally extending grooves in the seat ring 24. As is now evident, the ribs 30 prevent the valve element 26 as well as the upwardly extending valve stem 30 from rotating but such ribs permit the valve element and the valve stem to reciprocate vertically.

The barrel means 14 is provided with at least one and preferably more hydrant nozzles 34, each of which is closed by a nozzle cap 36 detachably carried thereon. Each nozzle cap 36 is provided with a polygonal nut 38, preferably of pentagon shape.

The barrel means 14 has an open upper end portion for receiving a top closure member 40 which may be in the form of a bonnet shown herein and in U.S. Pat. No. 4,154,259 to Ellis et al issued May 5, 1979 or it may be in the form of the flat closure member shown in U.S. Pat. No. 4,083,377 to Luckenbill issued Apr. 11, 1978. In both instances, the top closure member 40 is provided with an aperture as shown in the aforementioned copending application of Leopold et al, Ser. No. 736,830, the aperture extending through the top closure member 40 from the exterior to the interior thereof.

The upper end of the valve stem 28 is similarly constructed to that of the aforementioned Leopold et al application Ser. No. 736,830 and it threadedly receives a rotatable operating nut 52 as best shown in FIGS. 1 and 2. The rotatable operating nut 52 has a polygonal end portion 60, preferably of pentagon shape extending out of the aperture as is conventional. In prior art arrangements of fire hydrants, a box end hydrant wrench was usually applied over the polygonal end portion 60 of the operating nut 52 for rotating the same to cause the valve stem means 28 to reciprocate vertically and, thus, open and close the hydrant.

To prevent the operating nut 52 from moving axially but permitting rotary movement of the same, there is provided a tubular hold down nut member 58 fully described in the aforementioned Leopold et al application Ser. No. 736,830.

As disclosed in the aforementioned Leopold et al application Ser. No. 736,830, the hydrant 10 is made tamperproof with respect to operation of the same by unauthorized persons by providing a dome shaped cap member 94 which is freely rotatably supported relative to the polygonal end portion 60 of the hold down nut 52. The dome shaped cap member 94 has a lower edge of its skirt closely spaced to the tubular hold down nut 58, thus, permitting only a limited access space 100 to the polygonal end portion 60 of the operating nut 52 and, thus, a conventional hydrant box wrench cannot be used.

Referring now to FIGS. 3-9, inclusive, there is disclosed as adjustable operating means 102 for operating the hydrant in the limited access space 100 as well as for removing the nozzle caps 36 from the nozzle 34. Additionally, the operating means 102 may also be used to apply a hose coupling 101 with pins 103 thereon to the hydrant nozzle 34 when the hydrant nozzle cap 36 has been removed. As shown in FIG. 9 and as will be described in more detail in the specification, the operating means 102 can engage one of the pins 103 of the hose coupling 101 and leverage can be applied thereto to thread the hose coupling onto the hydrant nozzle 34.

The operating means 102 includes a rugged handle assembly 104, the handle assembly 104 comprising a first tubular member 106 having exterior threads 108 extending along one end portion of its bore and a second tubular member 110 having interior threads 112 extending along one interior end portion of its bore for cooperating with said exterior threads 108. An unthreaded portion 114 of another interior end portion of the bore of the second tubular member 110 is provided with a key way 116 (FIGS. 4, 5 and 8).

The second tubular member 110 is provided with an axially extending exterior flange 118. A flat jaw part 120 is bolted to the flange 118 by bolt means 122, the flat jaw part projecting axially of the second tubular member 110. The flat jaw part 120 has a hook shaped end portion 124 which extends transversely across the axis of the handle assembly 104 and is provided with a pair of cooperating angularly spaced surfaces 126 and 128 which are spaced from and face the handle assembly 104. While the handle assembly 104 is of a rigid rugged construction, it will be noted the flat jaw part 120 has a thickness no greater than the limited access space 100 between the dome shaped cap 94 and the tubular hold down nut 58. The surfaces 126 and 128 are arranged to engage two surfaces of the polygonal end portion 60 of the operating nut 52.

Of couse, a third surface opposing the surfaces 126 and 128 must engage the polygonal end portion 60 of the operating nut 52 in order to rotate the same and to accomplish this, the handle assembly 104 is provided with a movable flat jaw part 130 which rides in the key way 116. The jaw part 130 also has a thickness no greater than the limited access space. By such an arrangement, the operating means 102 is adjustable for different size polygonal end portions 60 of the operating nuts 52 of the hydrant 10.

In more detail, the second tubular member 110 is provided with an intermediate unthreaded portion 132 of it bore between the interior threads 112 and the unthreaded portion 114 which is of greater diameter than the unthreaded portion 114 and of the same or less diameter than the threaded portion 112. A piston member 134 having a portion 136 abutting the first tubular member 106 is arranged to be moved by the first tubular member when the same is rotated relative to the second tubular member 110. The piston member 134 has a portion 138 of reduced diameter which extends into the bore 140 of the first tubular member 106, this portion being provided with a circumferentially extending exterior groove 142. A pin 144 rigidly supported by the first tubular member 106 extends radially into the groove 142 and, thus, permits the first tubular member 106 to rotate relative to the piston member 134 when the first tubular member is rotated relative to the second tubular member. The flat movable jaw part 134 has a tab 146 extending into a hole 148 in the piston member 134 and is fixedly attached therein by welding or the like as indicated at 149.

As is now evident, when the first tubular member 106 is rotated relative to the second tubular member 110, the piston member 134 which is moved by the first tubular member 106 advances or retracts the flat movable jaw part 103 in the key way 106, the piston 134 being able to extend into the intermediate portion 132 of the bore of the second tubular member 110.

The external surface of the first tubular member 106 and/or the second tubular member 110 may be knurled as indicated at 150. This permits the handle assembly 104 to be easily grasped.

Referring now to FIGS. 3 and 4, it will be noted that the handle assembly 104 is provided with an elongated rod shaped member 152 extending from the bore 140. The elongated rod shaped member 152 is rigidly secured in the end portion of the bore 140 by a radially extending drift pin 154. The outer end portion of the elongated rod shaped member 152 is provided with exterior threads 156 and a reduced diameter cylindrical end 158 having a planar flat surface 160. A box wrench head member 162 having a tubular boss 164 extending from a side of the same is provided with a polygonal aperture 166. The tubular boss 164 is provided with a threaded bore 168 therethrough which opens to the polygonal aperture 166. As is now apparent, the box wrench head member 162 can be threaded onto the threads 156 of the elongated rod shaped member 152 and the cylindrical end 158 can be adjusted to a particular size of polygonal shaped nut 38 of the hydrant nozzle caps. This portion of the operating means 102 is utilized to remove the nozzle caps 36 since the head member 162 as well as the elongated rod shaped member 152 and the remaining portions of the handle assembly 106 are of rugged construction.

The box wrench head member 162 is provided with an outwardly extending hook shaped spanner arm 170 provided with a cut out 172. As shown in FIG. 9, the hook shaped spanner arm 170 can be engaged about the pin 103 of the hose coupling with the boss 164 of box wrench member 162 engaging a peripheral portion of the hose coupling 101 and the handle assembly 104 can then be used for leverage to thread the hose coupling 101 onto the hydrant nozzle 34 after the cap 36 has been removed.

By utilizing an operating means 102 as described above, it is not necessary for the firemen to carry separate tools for turning the water off and on in the hydrant, for removing the nozzle caps and for attaching the hose couplings. The ruggedness of the handle assembly 104 and of the box wrench head member 106 permits use of the operating means in situations where there is difficulty in removing the nozzle cap and it requires an implement which can be jumped on by personnel or hammered to obtain the necessary torque. While the portion of the operating means utilized for turning the hydrant off and on could not be used in situations as that just described, there is sufficient rigidity in the fixed jaw member 120 and the movable jaw member 130 to operate the operating nut 52.

The terminology used throughout the specification is for the purpose of description and not limitation, the scope of the invention being defined in the appended claims.

What is claimed is:

1. A tamperproof fire hydrant comprising:
   barrel means having an open upper end portion;
   valve means in a lower portion of said barrel means;
   valve stem means extending from said valve means upwardly within said barrel means;
   a top closure member secured to the upper end portion of said barrel means, said top closure member having an aperture therethrough;
   a rotatable operating nut operatively connected to said valve stem means for reciprocating the same, said rotatable operating nut having a polygonal end portion projecting out of the aperture of said top closure member;
   a tubular hold-down nut carried by said top closure member for positioning said rotatable operating nut against axial movement;
   a dome shaped cap covering the polygonal portion of said operating nut, said cap having a lower edge spaced from said hold-down nut to provide a limited access space to the polygonal end portion of said operating nut;
   means supporting said dome shaped cap on said polygonal end portion of said operating nut for relative free rotation with respect thereto; and
   operating means for rotating said polygonal end portion of said operating nut in said limited access space between said dome shaped cap and said hold-down nut, said operating means including a handle assembly having a fixed flat hook-shaped jaw part projecting axially of the same, said fixed flat jaw part having cooperating surfaces spaced from and facing said handle assembly for engaging at least two sides of the polygonal end portion of said operating nut, said fixed flat jaw part having a thickness no greater than said limited access space between said dome shaped cap member and said hold-down nut, said handle assembly further having a movable flat jaw part of a thickness no greater than the thickness of said fixed jaw part and having a surface opposing said surfaces of said fixed jaw part, means to move said movable jaw part toward said fixed jaw part to engage another surface of said polygonal end portion.

2. A tamperproof fire hydrant as claimed in claim 1 wherein said handle assembly includes a first tubular member having external threads along one end portion of the same, a second tubular member having internal threads along one interior end portion of the same for cooperating with said external threads of said first tubular member, said second tubular member having said fixed jaw part rigidly carried on the exterior thereof and having a key way along the remainder of its interior in which said movable jaw part can reciprocate, a piston member fixedly carried on the inner end of said movable jaw part and having a portion extending into said first tubular member and a portion abutting said first tubular member, and means between said piston member and said first tubular member permitting said first tubular member to be rotated relative to said piston member and said movable jaw part.

3. A tamperproof fire hydrant as claimed in claim 2 wherein said means between said piston member and said first tubular member includes an annular groove extending about the portion of said piston member extending into said first tubular member and a pin extending radially inwardly from said first tubular member into said annular groove.

4. A tamperproof fire hydrant as claimed in claim 3 wherein said second tubular member is provided with an axially extending flange and wherein said fixed jaw part is bolted to said axially extending flange.

5. A tamperproof fire hydrant as claimed in claim 2 including an elongated rod shaped member having one end portion extending into and being rigidly secured in an end portion of said first tubular member opposite the end portion thereof having external threads, said elongated rod shaped member having another end portion extending outwardly of said first tubular member and having exterior threads thereon with a cylindrical end having a planar flat surface, a box wrench head member having a polygonal aperture therethrough, said box wrench head member having a tubular boss extending therefrom with a bore therethrough opening to said polygonal aperture, said bore of said tubular boss being interiorly threaded to receive said exterior threads on said rod shaped member so that said planar flat surface of said cylindrical end which extends into said polygonal aperture may be adjusted to accommodate the polygonal aperture for different size polygonal nuts of hydrant nozzle caps.

6. A tamperproof fire hydrant as claimed in claim 5 wherein a pin extending radially through said first tubular member and said elongated rod shaped member rigidly secures said rod shaped member thereto.

7. A tamperproof fire hydrant as claimed in claim 5 including a hook shaped spanner arm extending from said box wrench head member for use in engaging a pin on a hose coupling.

8. A tamperproof fire hydrant as claimed in claim 7 wherein said means between said piston member and said first tubular member includes an annular groove extending about the portion of said piston member extending into said first tubular member and a pin extending radially inwardly from said first tubular member into said annular groove.

9. A tamperproof fire hydrant as claimed in claim 8 wherein said second tubular member is provided with an axially extending flange and wherein said fixed jaw part is bolted to said axially extending flange.

* * * * *